United States Patent [19]

Custro et al.

[11] Patent Number: 5,491,197

[45] Date of Patent: Feb. 13, 1996

[54] HYDROGENATED BLOCK COPOLYMERS CONTAINING EPOXY GROUPS AND THEIR PREPARATION

[75] Inventors: Sergio Custro, Ravenna; Gian I. Viola, Cervta Ravenna, both of Italy

[73] Assignee: Enichem Elastomeri S.R.L., Milan, Italy

[21] Appl. No.: 414,596

[22] Filed: Mar. 31, 1995

Related U.S. Application Data

[62] Division of Ser. No. 311,324, Sep. 23, 1994, abandoned, which is a division of Ser. No. 831,444, Feb. 5, 1992, Pat. No. 5,412,040.

[30] Foreign Application Priority Data

Feb. 6, 1991 [IT] Italy ................. MI91A0306

[51] Int. Cl.$^6$ ................................. C08F 8/08
[52] U.S. Cl. ................. 525/332.8; 525/332.9; 525/338; 525/339; 525/387; 525/388
[58] Field of Search ................. 525/332.8, 332.9

[56] References Cited

U.S. PATENT DOCUMENTS

| | | |
|---|---|---|
| 3,699,184 | 10/1972 | Taylor et al. . |
| 4,051,199 | 9/1977 | Udipi et al. . |

FOREIGN PATENT DOCUMENTS

| | | |
|---|---|---|
| 0268981 | 6/1988 | European Pat. Off. . |
| 0398758 | 11/1990 | European Pat. Off. . |
| 2061961 | 5/1981 | United Kingdom . |
| 2207679 | 2/1989 | United Kingdom . |
| 2225330 | 5/1990 | United Kingdom . |

Primary Examiner—Bernard Lipman
Attorney, Agent, or Firm—Oblon, Spivak, McClelland, Maier & Neustadt

[57] ABSTRACT

A description follows of epoxydated block copolymers, either linear or branched, which can be defined with the following formulae:

1) $[A-(E-B-EPOX)]_nX$
2) $A_1-(E_1-B_1-EPOX_1)-A-HT-(E_2-B_2-EPOX_2)$
3) $[(E_1-B_1-EPOX_1)-HT-A(E_2-B_2-EPOX_2)]_xX$ where A is a polyvinylaromatic block in a percentage ranging from 10 to 50% by weight, E—B—EPOX is a block composed of ethylene units, epoxydated butene and diene units in which the percentage by weight of the epoxy group ranges from 1% to 40%, HT is a tapered copolymer segment made up of hydrogenated and epoxydated diene monomeric units and vinylaromatic units whose content ranges from 0 to 20%, x is a radical having a valence ranging from 1 to 20.

The block copolymers have an average molecular weight ranging from 30,000 to 400,000, a content of polyvinylaromatic blocks of between 10 and 50% by weight and a content of $(E_1-B_1-EPOX_1)+(E_2-B_2-EPOX_2)$ blocks ranging from 90 to 50% by weight; the weight ratio between $(E_1-B_1-EPOX_1)$ and $(E_2-B_2-EPOX_2)$ ranges from 0.1 to 1.0. These polymers are used in the preparation of polymeric compositions based on engineering polymers such as polyamides, polycarbonate, polyesters, improving their physical properties and above all their impact strength and in mixtures with oils and hydrocarbon resins to produce materials having excellent adhesion of polar substrates.

30 Claims, No Drawings

HYDROGENATED BLOCK COPOLYMERS CONTAINING EPOXY GROUPS AND THEIR PREPARATION

This is a division, of application Ser. No. 08/311,324 filed on Sep. 23, 1994 now abandoned; which is a divisional application of Ser. No. 07/831,444, filed on Feb. 5, 1992, now U.S. Pat. No. 5,412,040.

The present invention relates to the preparation of hydrogenated block copolymers, modified by the insertion of epoxy groups into the molecular chain, their preparation and use especially in the field of polymeric compositions and adhesives.

The anionic polymerization of diene and vinyl-aromatic monomers in the presence of alkyl-metal or aryl-metal catalysts to obtain "living polymers", is already well-known.

This preparation, for example, is described by M. Szwarc in "Carbanions; living polymers and el. transfer processes", Interscience Publisher, J. Wiley and Sons, N.Y. 1956.

In particular, with the known procedures it is possible to prepare both linear and branched block copolymers especially block copolymers of polystyrene and polybutadiene such as those described in the disclosure of U.S. Pat. Nos. 3,078,254, 3,244,644, 3,265,765, 3,280,084, 3,594,452, 3,766,301, 3,937,760.

Again with the known procedure, it is possible to prepare multi-block polymers such as:

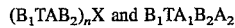

$(B_1TAB_2)_nX$ and $B_1TA_1B_2A_2$ described in Italian Patent Applications 21563 A/87 and 21042 A/90, filed in the name of the present Applicant, where $B_1$ and $B_2$ are polydiene, preferably, polybutadiene blocks wherein the molecular weight of the $B_2$ blocks varies from 0.1 to 0.3 times the weight of blocks $B_1$ and A, $A_1$ and $A_2$ are polyvinylaromatic, preferably polystyrene blocks and T is a tapered copolymer segment made up of diene and vinylaromatic units, whereas X is a coupling radical having a value equal to n.

The block copolymer, whose content ranges from 0 to 20% of the total copolymer, comes from the coupling of growing chains with coupling agents such as bicarboxylic acids, halogen derivatives of silanes, chloroderivatives of silicon and tin, etc.

The above-mentioned polymers are used in different technical fields depending on their specific composition and shape.

For example, copolymers having the above general formula with a low content of vinylaromatic monomers are suitable for formulation with oils and resins for the preparation of adhesive mixtures and have good properties of adhesion and cohesion, whereas polymers having the same general formula but with a high content of vinylaromatic monomers, give products which are suitable for use as modifiers of plastic materials.

The hydrogenation of the diene units of the above copolymers, especially those containing 1,2 polybutadiene units in quantities of between 25 and 50% by weight, can be carried out in accordance with the known art as described for example in U.S. Pat. No. 3431323 and produces materials (SEBS) (styrene-ethylene-butene-styrene) having improved thermostability, which are particularly suitable when higher working temperatures are required, such as for the modification of engineering polymers, to which these saturated elastomers give a better impact strength, or where excellent resistance is required under critical operating conditions, such as in the field of adhesives and sealants.

The absence of polar groups in the molecular chain of these elastomers and more generally of all hydrogenated block copolymers of the SEBS kind, i.e. having styrene-ethylene-butene-styrene sequences, has a negative effect on their range of application when it is important to have compatibility both with polar substrates (glass and metal) in the field of adhesives and sealants, and for the modification of plastic materials (polyesters, polyamides, polyphenyleneoxides etc.).

For this purpose, post-modifying techniques of block copolymers have been studied, which are able to insert polar groups onto a saturated polymeric structure by means of grafting techniques.

In general the art describes the functionalization of these polymeric substrates by the reaction of radicals, generated by the thermal decomposition of peroxides, with reactive protons (secondary and tertiary carbons) present in the main polymeric chain and the subsequent reaction of the macro-radicals thus formed with olefinic monomers having polar functions.

Among the olefinic monomers having polar functions and used in the above functionalization, we can mention glycidylmethacrylate. Patent EP 0268981 discloses the grafting reaction of polyglycidylmethacrylic groups on the polymeric chain giving polymers in which the epoxy group is situated on a side chain of the polymer making it particularly sensitive to reactions which cause its opening, with the consequent possible gelification of the entire mass of reagents during the grafting phase. Other drawbacks connected with the insertion of the glycidylic system, as a side chain of the block polymer, consist in the incomplete conversion of the above-mentioned monomers, and/or the formation of non-grafted homopolymers.

The purpose of the present invention is to overcome the above drawbacks of the known art.

It has in fact been found by the Applicant that the insertion of epoxy groups in the polymeric chain by the action of peracids on part of the unsaturations, both of the 1,4-cis and 1,4 trans type, originally present in the polydiene blocks, which are partially hydrogenated for this purpose, produces a further and unexpected improvement in their compatibility with polar materials, whereas the mechanical properties and thermo-oxidation stability of the polymeric substrate in question remain unaltered.

The high stability of the epoxides having the above configuration allows saturated polymers to be produced with a content in the epoxy groups of as much as 20% of diene double bonds present in the block copolymer before its hydrogenation, without problems due to the production of gels caused by the hydrolysis of the oxirane ring, referred to in the drawbacks of the known art.

In accordance with what has been specified above, the present invention relates to linear or branched block copolymers with partial hydrogenation of the diene blocks from 80 to 99% and thoroughly epoxydated, definable with the formula:

$$[A—(E—B—EPOX)]_nX \qquad (I)$$

where A represents a polyvinylaromatic block, preferably polystyrene, E-B EPOX is an ethylene-butene copolymer block containing 1,4 cis and trans epoxy units, distributed along the polymeric chain, n is an integer between 1 and 20 and X is a coupling radical having a value of n, said copolymers having a weight average molecular weight of from 30,000 to 400,000, a polyvinylaromatic block content of between 10 and 50% by weight, a content of EPOX units ranging from 1% to 20% of the initial unsaturations present in the polymer before its partial hydrogenation.

The present invention also relates to linear or branched block copolymers, wherein the diene blocks have been partially hydrogenated and then fully epoxydated, definable with the formula, $$[(E_1—B_1—EPOX_1)—HT—A—(E_2—B_2—EPOX_2)]_nX \qquad (II)$$

where

A represents a polyvinylaromatic block forming from 10 to 50% by weight of the total copolymer, HT is a tapered copolymeric segment composed of vinylaromatic and diene units whose percentage by weight of the total polymer ranges from zero to 20%, the unsaturations of this tapered copolymer having been partially hydrogenated and subsequently fully epoxydated; x has the above-mentioned meaning, ($E_1$—$B_1$—$EPOX_1$) and ($E_2$—$B_2$—$EPOX_2$) represent ethylene-butene block copolymers containing 1,4 cis and TRANS epoxy units deriving from the epoxydation of a number of unsaturations ranging from 1 to 20% of the initial unsaturations present in the polymer before hydrogenation and forming, if taken together, from 50% to 90% by weight of the total copolymer; the weight ratio between ($E_1$—$B_1$—$EPOX_1$) ($E_2$—$B_2$— $EPOX_2$) ranges from 0.1 to 1.0, and the molecular weight of the block copolymers represented by formula II, ranges from 30.000 to 400,000.

The present invention also relates to linear block copolymers, deriving from the block copolymerization of vinylaromatic and diene monomers, wherein the diene blocks have been partially hydrogenated and then fully epoxydated, definable with the formula, $$A_1—(E_1—B_1—EPOX_1)—A_2—HT—(E_2—B_2—EPOX_2) \qquad (III)$$

where $A_1$ and $A_2$ represent vinylaromatic blocks

HT is a tapered copolymer segment composed of vinylaromatic and diene units whose percentage is from 0 to 20% (w/w) on total polymer, the unsaturations of this tapered copolymer having been partially hydrogenated and subsequently fully epoxydated; ($E_1$—$B_1$—$EPOX_1$) and ($E_2$—$B_2$—$EPOX_2$) represent ethylene-butene block copolymers containing 1,4 cis and trans epoxy units deriving from the expoydation of a number of unsaturations ranging from 1 to 20% of the initial unsaturations and the weight ratio between ($E_1$—$B_1$—$EPOX_1$) and ($E_2$—$B_2$—$EPOX_2$) ranges from 0.1 to 1.0, the molecular weight of the block copolymers represented by formula III, ranging from 30,000 to 400,000.

More specifically, the present invention relates to linear, branched or radial block copolymers corresponding to the above-mentioned general formulae I, II, III, containing a ratio between the vinylaromatic/diene units with values of between 10/90 and 50/50 and preferably in the range of 45/85 and 55/15, and having a molecular weight of between 30,000 and 400,000, obtained by means of a synthesis process of which the main steps are:

1) Synthesis of the block copolymer having formula I, II, III
2) Partial hydrogenation of said copolymer
3) Exhaustive epoxydation of the present unsaturations.

The synthesis conditions of the block copolymer having formula I, II and III are those which are already known in the art.

The preparation of the block copolymers similar to the precursors (before partial hydrogenation and epoxydation of the parent polymer) of those described in the present Patent Application, is for example disclosed in Italian Patent Applications 21563 A/87 and 21042 A/90 filed by the same Applicant.

However the precursors (parent polymer) of the polymers having general formula I can be synthesized as follows:

a) A certain dosage of a vinylaromatic monomer is polymerized to total conversion, by using the living polymer technique
b) A certain dosage of diene monomer is added to the resulting product of stage (a) until total or almost total conversion
c) The living chains obtained in (b) are coupled, using a polyfunctional coupling agent
d) The block copolymer produced from the coupling reaction is recovered.

The precursors of the polymers corresponding to general formula II are prepared as follows:

a) Certain dosages of a mixture of diolefin and vinylaromatic monomer are polymerized, using the living polymer technique, to total or almost total conversion of the monomers.

In this step, as the monomers react in accordance with their reactivity, a polydiene block is first formed, which will grow until the amount of diene becomes so small and is dispersed in the mass of vinylaromatic monomer as to form a tapered copolymer linked to the above diene block. When all the diene has reacted, the vinylaromatic monomer polymerizes producing a polyvinylaromatic block. In conclusion, if butadiene and styrene are used, in this step the living polymer is formed in three polybutadiene-T-A blocks, where T is a tapered butadiene-styrene copolymer.

b) A certain dosage of diene monomer is added to the resulting product of step (a) and the mixture is polymerized to total or almost total conversion of the fed diene monomer;
c) The living polymeric chains obtained in step (b) are coupled, using a polyfunctional coupling agent;
d) The branched block copolymer resulting from the coupling reaction in step (c) is recovered.

On the contrary, the following procedure should be adopted for the synthesis of the parent copolymer of the branched block copolymer, corresponding to formula II but without the copolymeric segment T (percentage of block HT, in the final hydrogenated and epoxydated copolymer, is equal to 0):

a) A certain dosage of diolefin is polymerized, using the live polymer technique, to total or almost total conversion of the fed diolefin;
b) A certain dosage of vinylaromatic monomer is added to the resulting product of step (a) and the mixture is polymerized to total or almost total conversion of the vinylaromatic monomer fed;
c) A certain dosage of diolefin is added to the resulting product of step (b) and the mixture is polymerized to total or almost total conversion of the diolefin fed;
d) The living polymeric chains obtained in step (c) are coupled using a polyfunctional coupling agent;
e) The branched block copolymer is recovered from the coupling reaction in step (d).

The precursor (parent polymer) of the polymer corresponding to general formula III is prepared as follows:

a) Certain dosages of a mixture of diene and vinylaromatic monomer are polymerized in a first step, using the living polymer technique, to total or almost total conversion of the monomers.

In this step, as the monomers react in accordance with their reactivity, a diene block is first formed, which will grow until the diene becomes so small and is dispersed in the mass of styrene as to form a tapered copolymer linked to the above diene block. When all the diene has reacted, the styrene polymerizes to form a styrene block. In conclusion, if butadiene and styrene are used in this step the living polymer is formed in three polybutadiene-T-A blocks, where T is a tapered non-hydrogenated butadiene-styrene copolymer;

b) A certain dosage of diene is added to the resulting product of step (a) and the mixture is polymerized in a second step, using the living polymer technique, until total or almost total conversion of the diene fed;

c) A certain dosage of vinylaromatic monomer is added to the resulting product of step (b) and the mixture is polymerized, in a third step, until total or almost total conversion of the vinylaromatic monomer fed;

d) The living polymer is stopped with a proton-generating substance, for example, $H_2O$;

e) The copolymer is recovered from the polymerization products of the third step.

For the synthesis of the parent copolymer of the branched block copolymer, corresponding to formula III but without the copolymeric segment T (percentage of block HT, in the final hydrogenated and epoxydated copolymer, equals 0), the following procedure is used:

a) Certain dosages of a diene are polymerized, using the living polymer technique, until total or almost total conversion.

b) A certain dosage of vinylaromatic monomer is added to the resulting product of (a) until total or almost total conversion;

c) A certain dosage of diene monomer is added to the resulting product of (b) until total or almost total conversion;

d) A certain dosage of vinylaromatic monomer is added to the resulting product of (c) until total or almost conversion;

e) The living polymer is stopped using a proton-generating substance (such as $H_2O$);

f) The copolymer is recovered from the polymerization products of step (d).

A more detailed description of the synthesis conditions of some of the polymer precursors having formulae I, II, III is however given in the examples which follow.

The present invention, on the other hand, includes the discovery of the operating conditions for the partial hydrogenation of the diene unsaturations present in the precursors (before the partial saturation and epoxydation) of the copolymers corresponding to formulae I, II and III.

This saturation is carried out using catalysts based on nickel (mainly nickel naphthenate or Ni-acetylacetonate reduced with aluminium alkyls, with the aim of leaving reaction sites for the subsequent epoxydation.

The epoxydation of unsaturated polymers is already known in the art (see for example Dh. Schulz & al. RUBBER CHEMISTRY AND TECHNOLOGY 55, 809 (1982); generally the oxidizing agent of the double bond is a pre-prepared peracid or, alternatively, prepared in the reaction medium by means of combinations of organic acids and hydrogen peroxide possibly in the presence of strong acids.

Pre-prepared acids suitable for the purpose include, for example, peracetic acid and m-chloro perbenzoic acid whereas among the acids prepared "in situ" the best results are obtained with formic acid and its mixtures with acetic acid, the latter possibly in the presence of a cationic resin, or a strong acid such as $H_2SO_4$ or toluenesulphonic acid.

In accordance with the known art, the expoxydation reaction may be conveniently carried out in the polymeric solution where the hydrogenation took place or, alternatively, the polymer, after partial hydrogenation, may be re-dissolved in a suitable solvent such as toluene or benzene or hexane and the reaction carried out in this new solution.

However, the epoxydation of polymers having a molecular weight which is higher than 60,000 leads to the production of gels in the reaction mixture particularly if the solvent used is cyclohexane and the epoxydizing agent is performic acid (see for example K. UDIPI, J. OF APPLIED POLYMER SCIENCE VOL. 23, 33113321 (1979). In any case there is a considerable conversion of the oxirane rings giving esters and alcohols.

Forming part of the present invention is the discovery that the above-mentioned limits may be entirely overcome when epoxydation is carried out on polyvinylaromatic-polydiene block copolymers partially saturated with hydrogen, producing materials in which the oxirane rings, resulting from the oxidation of the 1,4 cis and 1,4 trans double bonds, are situated on the polymeric chain and for this reason are particularly stable to hydrolysis during the epoxydation reaction.

In this way, it is possible to prepare, without any limits of molecular weights, products containing up to 20% of non-hydrolized epoxy groups with respect to the double bonds existing before hydrogenation, obtaining the polymers described in formulae I, II and III.

Due to the stability of the reaction products, the epoxydation reaction can be carried out under drastic conditions with temperatures ranging from 50° to 90° C. (preferably 70°) using for example performic acid prepared "in situ": the result is a high reaction rate and an almost total conversion of the residuous double bonds into epoxy groups.

It is widely known that the use of hydrogenated styrene-diene copolymers is extremely advantageous in the modification of a vast range of mixtures composed of plastic polymers such as polyolefins, polyethylene; the interphase adhesion of the different polymeric phases is in fact sufficient for these blends as an excellent dispersion of the elastomer is obtained.

If styrene diene copolymers are mixed with plastic materials having polar chemical structures (polycarbonate, polyamides, polyphenyleneoxide . . . ) chemical reactions and dipole-dipole interactions are necessary until the various phases have a sufficient interfaces adhesion: the use of hydrogenated and epoxydated block copolymers allows for an excellent dispersion of the elastomer in the engineering polymer considerably improving the impact strength with respect to the same mixtures prepared with non-modified polymers.

In fact, linear, branched and multiblock copolymers represented in formulae I, II and III, blended with polar plastomers, such as polyethylene terephthalate, polybutylene terephthalate, nylon, epoxy resins, produce materials having excellent impact strength.

Similarly, hydrogenated styrene-diene block copolymers are used in formulation with hydrocarbon resins and other additives in compositions used for sealant blends. However, because of their non-polar nature together with their high cohesion properties, these mixtures produce sealants with typically poor adhesion on polar substrates.

The use of mixtures containing hydrogenated and epoxydated block copolymers in the field of sealants gives products which have excellent adhesion to polar substrates maintaining the cohesion properties typical of these materials.

The examples which follow are intended to illustrate the present invention but do not limit it in any way.

EXAMPLE 1

Preparation of butadiene-styrene copolymers.

A) 1,200 g of anhydrous cyclohexane containing 4 g of tetrahydrofuran and 43 g of styrene are poured into a 2000 ml reactor under stirring.

The temperature of the mixture is brought to 55° C. and 0.42 g of lithium n-butyl in a solution of n-hexane are then added. After 30' upon total conversion of the styrene (T=60° C.), 101 g of butadiene are fed with a consequent increase in temperature to 100° C. in about 10'. 0.79 g of diphenyldichloro silane in a solution of cyclohexane are added and the mixture is kept under stirring for a further 5 minutes until the coupling reaction of the living chains is complete. Copolymer A is thus obtained with the characteristics shown in Table 1.

B) Following the procedure described in the previous point, but using 0.27 g of $SiCl_4$ instead of diphenyldichloro silane, radial copolymer B is prepared, with the characteristics shown in Table 1.

C) 1,200 g of anhydrous cyclohexane containing 4 g of THF and 16 g of Bde are poured into a 2000 ml reactor and 0.42 g of Li-s.butyl are added at a temperature of 50° C.

After 10' when the temperature of the reaction mixture has reached 55° C., 92 g of styrene are added until the temperature has risen to 58° C. and then an amount of 92 g of Bde. When the final temperature has reached 85° C., 0.28 g of $SiCl_4$ in a solution of cyclohexane are added with total coupling of the living chains to give polymer C of the type $(B_1—T—A—B_2)_nX$ where $B_1$ and $B_2$ are two butadiene blocks, T is a Tapered junction and A is the styrene block whose macromicromolecular characteristics are shown in Table 1.

D) Following the same procedure and with the same quantities as point A, linear copolymer D is prepared using 2 g of anhydrous THF in the reaction solvent. The characteristics are shown in Table 1.

TABLE 1

| Polymer | A | B | C | D |
| --- | --- | --- | --- | --- |
| Mol. weight Mw (1) | 45,000 | 90,000 | 120,000 | 46,000 |
| Mol. weight Mn (1) | 42,000 | 88,000 | 110,000 | 44,000 |
| Gel % W (2) | 0 | 0 | 0 | 0 |
| Styr. % W (3) | 30 | 30 | 46 | 30 |
| 1.2% (4) | 38 | 38 | 38 | 33 |
| Styr. % in block (5) | 29 | 29 | 42 | 29 |

1) GPC analysis
2) After dissolution in toluene at 30° C. for 4 hours at a 0.5% concentration by weight
3) I.R.

TABLE 1-continued

| Polymer | A | B | C | D |
| --- | --- | --- | --- | --- |

4) I.R.
5) After demolition with $OsO_4$

EXAMPLE 2

The hydrogenation of polymers A, B, C, D whose preparation is described in the previous example, was carried out in a 1000 cc reactor to which 500 cc of the polymeric solutions were added under a hydrogen atmosphere.

The mixture was brought to 60° C. and a catalyst was added, prepared by mixing nickel naphthenate and aluminium diisobutylhydride in cyclohexane in the quantities and ratios shown in Table 2.

The mixture of reagents was kept under stirring for periods ranging from 15' to 90' and under hydrogen pressures ranging from 2 to 20 atmospheres depending on the degree of hydrogenation to be obtained.

The reaction mixture was then transferred to a 2000 cc reactor where the catalytic residues were removed by washing with acid water.

The following Table shows the characteristics of the products obtained and the operating conditions for each of them.

In the case of polymer D, the washing with acid water was not carried out.

TABLE 2

| PARENT POL. | HYDROG. PRESSURE (Atm) | HYDROG. TIME (min) | CAT. AMOUNT gr/100 g polymer | Al/Ni RATIO moles/ moles | HYDROG. DEGREE % (*) | RES. 1,2% | HYDROG. POLYMER |
| --- | --- | --- | --- | --- | --- | --- | --- |
| A | 20 | 15 | 0.3 | 3 | 80.4 | 0 | E |
|   | 20 | 90 | 0.3 | 3 | 97.5 | 0 | F |
| B | 20 | 15 | 0.35 | 3 | 84.6 | 0 | G |
|   | 20 | 90 | 0.35 | 3 | 98.0 | 0 | H |
| C | 20 | 60 | 0.3 | 3 | 93.9 | 0 | I |
|   | 20 | 90 | 0.3 | 3 | 97.5 | 0 | L |
| D | 6 | 15 | 0.1 | 3 | 61.1 | 0 | M |

(*) Referred to the soft segment

EXAMPLE 3

Epoxydation

Epoxydation was carried out on the polymeric solutions in cyclohexane by adding formic acid and hydrogen peroxide in a molar ratio equal to 1. The best quantity of formic acid and hydrogen peroxide with respect to double bond was between 2 and 3 (molar ratio) according to the following procedure.

The polymeric solutions to which formic acid had been added were brought to a temperature of 70° C., $H_2O_2$ (28% Wt) was added dropwise for a period of between 5 and 30', after the addition of hydrogen peroxide the solution of the reactants was kept at 70° C. for a period ranging from 1 to 5 hours.

In this way, the epoxydation reaction was completed and both the hydrogen peroxide and formic acid were entirely eliminated. When the epoxydation reaction of the polymer had been completed on the coagulated product, by adding isopropylic alcohol, and then dried in an oven under vacuum at 60° C. for 4 hours, the volumetric determination of the content in epoxide was carried out with HBr formed "in situ" from the reaction of ammonium tetraethylbromide and perchloric acid in a non-acqueous solvent following the method of Jay (Anal. Chem. 36) (3) 1964, 67).

The polymers thus prepared were without insoluble fractions and upon GPC analysis produced molecular weight distributions very similar to those of the parent polymers.

Table 3 shows the conditions used to obtain, starting from partially hydrogenated polymers E,G, I, L, the corresponding epoxydated polymers N, O, P, Q.

In the case of the partially hydrogenated polymer M, the epoxydation reaction following the previously described methods, was carried out directly in the solution containing the catalytic residues after hydrogenation.

TABLE 3

| PARENT POLYM. | HYDROG. DEGREE % | FORM. ACID g./100 polym. | $H_2O_2$ g. $H_2O_2$/ 100 g polym. | React. time hrs | Oxyr. Oxyg. (W %) (1) | Ep. Yield resp. to double bonds | EPOXYD. POLYM. |
|---|---|---|---|---|---|---|---|
| E | 80.4 | 27.7 | 21.5 | 4 | 3.9 | 96 | N |
| G | 84.6 | 26.3 | 21.2 | 3 | 3.1 | 97 | O |
| I | 93.9 | 15.4 | 8.7 | 2.5 | 0.93 | 96 | P |
| L | 97.5 | 3.6 | 2.8 | 1.5 | 0.37 | 93 | Q |
| M | 61.1 | 71.0 | 51.5 | 5 | 7.8 | 96 | R |

(1) g Epoxidic Oxygen for 100 g of polymer

EXAMPLE 4

Evaluation of epoxydated copolymers in formulations for sealants

Block copolymers N and F whose main characteristics are shown in Table 4, obtained by means of the previously described method, were used for the preparation of an application mixture (recipe**1) in the field of sealants.

RECIPE 1

| FORMULATION | phr. |
|---|---|
| Polymer | 100 |
| Regalrez 1018 (1) | 270 |
| Endex 160 (2) | 50 |
| Irganox 1010 (3) | 1 |
| Tinuvin 770 (4) | 1 |
| Tinuvin P (5) | 1.5 |

RECIPE 1

| FORMULATION | phr. |
|---|---|
| 1) Hercules hydrogenated resin | |
| 2) Hercules aromatic resin | |
| 3) Ciba-Geigy anti-oxidant | |
| 4) Ciba-Geiger U.V. absorber | |
| 5) Ciba-Geiger U.V. absorber | |

TABLE 4

| PROPERTIES | POLYMER N | POLYMER F |
|---|---|---|
| STYRENE % | 30 | 30 |
| Mw | 45,000 | 45,000 |
| % OXYRANE OXYGEN | 3.9 | 0 |
| ULTIMATE TENSILE STRENGTH (MPa) | 29 | 30 |
| ELONGATION TO BRAKE | 540 | 550 |
| DENSITY | 0.92 | 0.92 |

The mixtures were prepared using a mixer with sygma blades for 45 minutes at 180° C.

Table 5 shows the results obtained in the 180° peel adhesion test on glass, aluminium and steel having the formulation indicated in Table 3 using polymers N and F.

TABLE 5

| | FORMULATION WITH POLYMER F | FORMULATION WITH POLYMER N |
|---|---|---|
| ULTIMATE TENSILE STRENGTH (MPa) | 2.36 | 2.28 |
| 100% MODULE (MPa) | 320 | 450 |
| ELONGATION TO BRAKE | 750 | 800 |
| 180. PEEL ON GLASS (KN/M) | 6.1 (A) | 14.6 (A) |
| 180. PEEL ON STEEL (KN/M) | 4.7 (A) | 13.2 (A) |
| 180. PEEL ON ALUMINIUM (KN/M) | 2.4 (A) | 11.5 (A) |

(A) ADHESIVE FAILURE

EXAMPLE 5

Various dosages of poly(2,6 dimethyl/phenyl) ether with an intrinsic viscosity in chloroform of 0.33 (30° C.) together with a polyester terephthalate (produced by Nippon Unipet Co., Ltd) and each of the modified block copolymers N, O, P, Q, R and the unmodified copolymer F were dried in air for 5 hours at 120° C. and mixed in a BRAEBENDER mixer at 280° C. for 5 minutes.

The relative ratios of the mixtures used are shown in Table 6.

The results obtained were evaluated in the following ways:

1) DYNSTAT IMPACT STRENGTH measured in accordance with BS-1330-1946 (at 23° C.)
2) RESISTANCE TO SOLVENTS measured in accordance with the BERGEN method (S.P.E. Journal 667 (1962)
3) PLATE SEPARATION A sample obtained by heat compression is bent and broken and a visual examination of the breakage area is carried out to verify the presence or absence of plates.

TABLE 6

| Test n. | Amount of polyphenylether | Amount of polyester | Modified coplymer Type | Modified coplymer Amount | Impact stren. kg/cm2 | Solvent resistance | Plate separ. |
|---|---|---|---|---|---|---|---|
| 1 | 30 | 30 | N | 20 | 20 | good | N.O. |
| 2 | 50 | 50 | N | 20 | 20 | good | " |
| 3 | 30 | 70 | N | 20 | 20 | good | " |
| 4 | 70 | 30 | O | 20 | 20 | good | " |
| 5 | 50 | 50 | O | 20 | 20 | good | " |
| 6 | 30 | 70 | O | 20 | 20 | good | " |
| 7 | 50 | 50 | P | 20 | 20 | good | " |
| 8 | 30 | 70 | P | 20 | 20 | good | " |
| 9 | 50 | 30 | Q | 20 | 20 | good | " |
| 10 | 30 | 50 | Q | 20 | 20 | good | " |
| 11 | 70 | 70 | F | 20 | 20 | fair | " |
| 12 | 50 | 50 | F | 20 | 20 | fair | " |
| 13 | 30 | 70 | F | 20 | 20 | fair | " |
| 14* | 70 | 30 | X | | 20 | poor | O. |
| 15* | 50 | 50 | X | | 20 | poor | " |
| 16* | 30 | 70 | X | | 20 | poor | " |
| 17 | 100 | 0 | N | 20 | 20 | poor | N.O. |

\* = without copolymer
N.O. = not observed
O. = observed

We claim:

1. A process for preparing a vinylaromatic-diene block copolymer, wherein said diene blocks have been partially hydrogenated and subsequently epoxidized according to formula (I):

(A—(E—B—EPOX))$_n$X    (I)

wherein A is a polyvinylaromatic block, (E—B—EPOX) is an ethylene-butene copolymeric block containing 1,4 cis and 1,4 trans epoxy units distributed along the polymeric chain, n is an integer between 1 and 20 and X is a coupling radical having functionality n, said copolymers having a weight average molecular weight ranging from 30,000 to 400,000, a content of polyvinylaromatic blocks of between 10 and 50% by weight, a content of EPOX units of between 1% and 20% of the initial unsaturations present in the polymer before its partial hydrogenation, comprising the steps of:

(a) partially hydrogenating diene blocks of a vinylaromatic-diene block copolymer; and (b) epoxidizing the partially hydrogenated vinylaromaticdiene block copolymer of step (a) to obtain a block copolymer according to formula (I).

2. The process according to claim 1, wherein step (a) is performed using a hydrogenation catalyst at a hydrogen pressure ranging from 20 to 1,000 p.s.i. and at a temperature ranging from 30° to 200° C.

3. The process according to claim 2, wherein said hydrogen pressure ranges from 150 to 600 p.s.i., said temperature ranges from 40° to 130° C. and said catalyst is obtained by contacting an alkyl aluminum compound with a compound containing nickel or cobalt.

4. The process according to claim 3, wherein said catalyst is obtained by contacting an alkyl aluminum compound with a nickel compound for a period ranging from 4 to 120 minutes.

5. The process according to claim 1, wherein n is an integer between 1 and 4.

6. The process according to claim 1, wherein the vinylaromatic block is a styrene block.

7. The process according to claim 1, wherein step (b) comprises the steps of:

(i) dissolving the partially hydrogenated block copolymer of step (a) in an aliphatic solvent;

(ii) reacting said partially hydrogenated block copolymer with hydrogen peroxide and formic acid at a temperature of between 50° and 100° C.;

(iii) isolating the resultant polymer.

8. The process according to claim 7, wherein said aliphatic solvent is cyclohexane or n-hexane.

9. The process according to claim 7, wherein the molar ratio of formic acid to the double bonds of the hydrogenated polymer ranges from 5:1 to 2:1, the molar ratio of hydrogen peroxide to the double bonds of the partially hydrogenated polymer ranges from 5/1 to 2/1, and the ratio of hydrogen peroxide to formic acid is 1/1.

10. The process according to claim 7, wherein said reaction temperature of step (ii) is within the range of 60° to 90° C. and the reaction is allowed to occur from 2 to 4 hours.

11. A process for preparing a vinylaromatic-diene block copolymer, wherein said diene blocks have been partially hydrogenated and subsequently epoxidized, according to formula (II):

$$((E_1-B_1-EPOX_1)-HT-A-(E_2-B_2-EPOX_2))_nX \quad (II)$$

wherein A is a polyvinylaromatic block comprising from 10 to 50% by weight of the total copolymer, HT is a tapered copolymeric segment of vinylaromatic and diene units whose percentage by weight ranges from zero to 20% of the total copolymer, the unsaturations of said tapered copolymer having been partially hydrogenated and subsequently fully epoxidized, $(E_1-B_1-EPOX_1)$ and $(E_2-B_2-EPOX_2)$ are ethylene-butene block copolymers containing 1,4 cis and 1,4 trans epoxy units deriving from the epoxydation of a number of unsaturations ranging from 1 to 20% of the initial unsaturations, forming, if taken together, from 50% to 90% by weight of the total copolymer, in a weight ratio between $(E_1-B_1-EPOX_1)$ and $(E_2-B_2EPOX_2)$ of between 0.1 and 1.0, n is an integer between 1 and 20, the weight average molecular weight of the block copolymer corresponding to formula (II) ranges from 30,000 to 200,000, comprising the steps of:

(a) partially hydrogenating diene blocks of a vinylaromatic-diene block copolymer; and (b) epoxidizing the partially hydrogenated vinylaromatic-diene block copolymer of step (a) to obtain a block copolymer according to formula (II).

12. The process according to claim 11, wherein step (a) is performed using a hydrogenation catalyst at a hydrogen pressure ranging from 20 to 1,000 p.s.i. and at a temperature ranging from 30° to 200° C.

13. The process according to claim 12, wherein said hydrogen pressure ranges from 150 to 600 p.s.i., said temperature ranges from 40° to 130° C. and said catalyst is obtained by contacting an alkyl aluminum compound with a compound containing nickel or cobalt.

14. The process according to claim 13, wherein said catalyst is obtained by contacting an alkyl aluminum compound with a nickel compound for a period ranging from 4 to 120 minutes.

15. The process according to claim 11, wherein n is an integer between 1 and 4.

16. The process according to claim 11, wherein the vinylaromatic block is a styrene block.

17. The process according to claim 11, wherein step (b) comprises the steps of:

(i) dissolving the partially hydrogenated block copolymer of step (a) in an aliphatic solvent;

(ii) reacting said partially hydrogenated block copolymer with hydrogen peroxide and formic acid at a temperature of between 50° and 100° C.;

(iii) isolating the resultant polymer.

18. The process according to claim 17, wherein said aliphatic solvent is cyclohexane or n-hexane.

19. The process according to claim 17, wherein the molar ratio of formic acid to the double bonds of the hydrogenated polymer ranges from 5:1 to 2:1, the molar ratio of hydrogen peroxide to the double bonds of the partially hydrogenated polymer ranges from 5/1 to 2/1, and the ratio of hydrogen peroxide to formic acid is 1/1.

20. The process according to claim 17, wherein said reaction temperature of step (ii) is within the range of 60° to 90° C. and the reaction is allowed to occur from 2 to 4 hours.

21. A process for preparing a vinylaromatic-diene block copolymer, wherein said diene blocks have been partially hydrogenated and subsequently fully epoxidized, according to formula (III):

$$A_1-(E_1-B_1-EPOX_1)-A_2-HT-(E_2-B_2-EPOX_2) \quad (III)$$

wherein $A_1$ and $A_2$ are vinylaromatic blocks,

HT is a tapered copolymeric segment of vinylaromatic and diene units whose weight percentage ranges from zero to 20% by weight of the total copolymer, the unsaturations of said tapered copolymer having been partially hydrogenated and subsequently fully epoxidized, $(E_1-B_1-EPOX_1)$ and $(E_2-B_2-EPOX_2)$ are ethylene-butene block copolymers containing 1,4 cis and 1,4 trans epoxy units deriving from the epoxydation of a number of unsaturations ranging from 1 to 20% of the initial unsaturations, forming, if taken together, from 50% to 90% by weight of the copolymer, in a weight ratio between $(E_1-B_1-EPOX_1)$ and $(E_2-B_2-EPOX_2)$ ranging from 0.1 to 1.0, the weight average molecular weight of the block copolymer corresponding to formula (III) ranges from 30,000 to 200,000, comprising the steps of:

(a) partially hydrogenating diene blocks of a vinylaromatic-diene block copolymer; and (b) epoxidizing the partially hydrogenated vinylaromaticdiene block copolymer of step (a) to obtain a block copolymer according to formula (III).

22. The process according to claim 21 wherein step (a) is performed using a hydrogenation catalyst at a hydrogen pressure ranging from 20 to 1,000 p.s.i. and at a temperature ranging from 30° to 200° C.

23. The process according to claim 22, wherein said hydrogen pressure ranges from 150 to 600 p.s.i., said temperature ranges from 40° to 130° C. and said catalyst is obtained by contacting an alkyl aluminum compound with a compound containing nickel or cobalt.

24. The process according to claim 23, wherein said catalyst is obtained by contacting an alkyl aluminum compound with a nickel compound for a period ranging from 4 to 120 minutes.

25. The process according to claim 21, wherein n is an integer between 1 and 4.

26. The process according to claim 21, wherein the vinylaromatic block is a styrene block.

27. The process according to claim 21, wherein step (b) comprises the steps of:

(i) dissolving the partially hydrogenated block copolymer of step (a) in an aliphatic solvent;

(ii) reacting said partially hydrogenated block copolymer with hydrogen peroxide and formic acid at a temperature of between 50° and 100° C.;

(iii) isolating the resultant polymer.

28. The process according to claim 27, wherein said aliphatic solvent is cyclohexane or n-hexane.

29. The process according to claim 27, wherein the molar ratio of formic acid to the double bonds of the hydrogenated polymer ranges from 5:1 to 2:1, the molar ratio of hydrogen peroxide to the double bonds of the partially hydrogenated polymer ranges from 5/1 to 2/1, and the ratio of hydrogen peroxide to formic acid is 1/1.

30. The process according to claim 27, wherein said reaction temperature of step (ii) is within the range of 60° to 90° C. and the reaction is allowed to occur from 2 to 4 hours.

* * * * *